Sept. 30, 1969     A. K. BEY     3,470,403
ELECTRIC MOTOR WITH TORQUE AMPLIFIED OUTPUT
Filed May 10, 1967     2 Sheets-Sheet 2
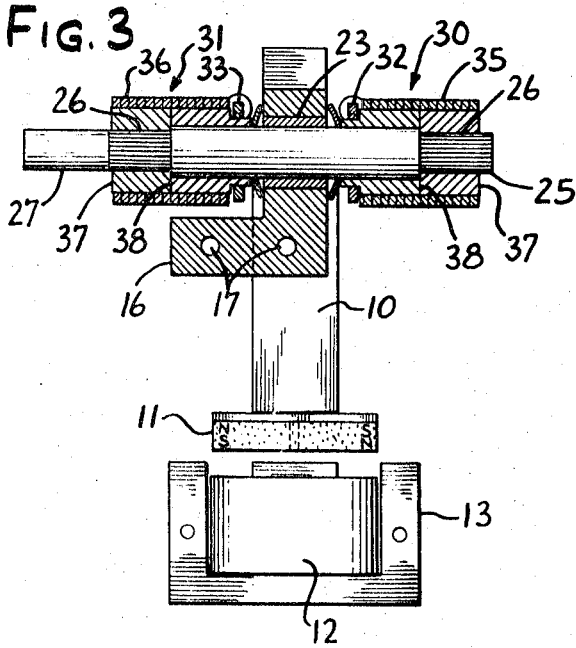
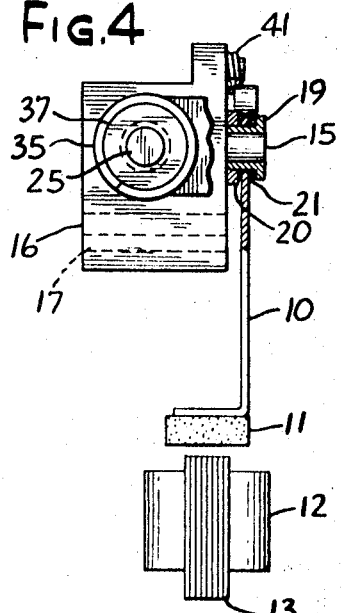
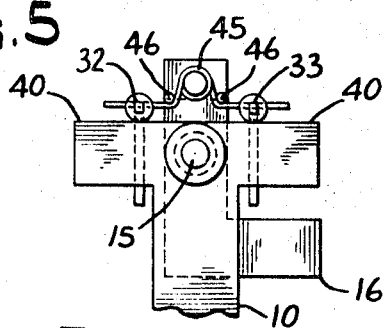
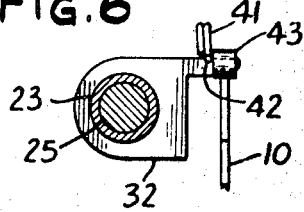
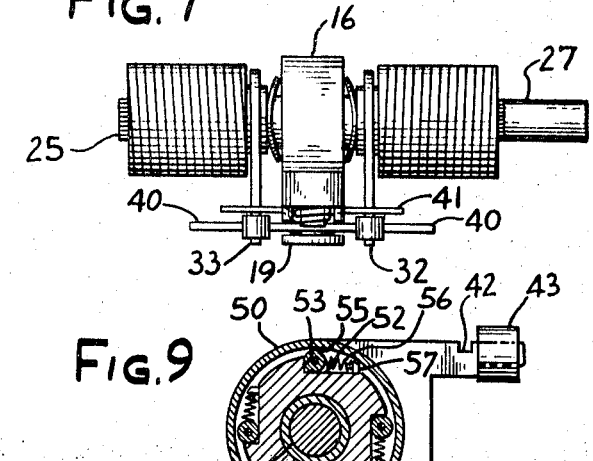
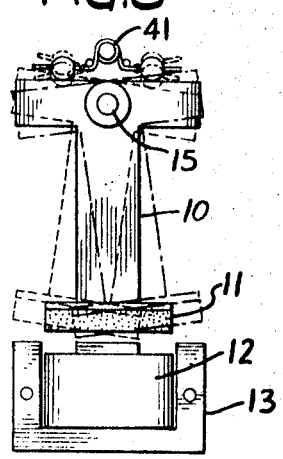
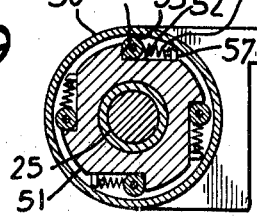
INVENTOR
AHMET K. BEY
by: Wolfe, Hubbard, Voit & Osann
ATTYS

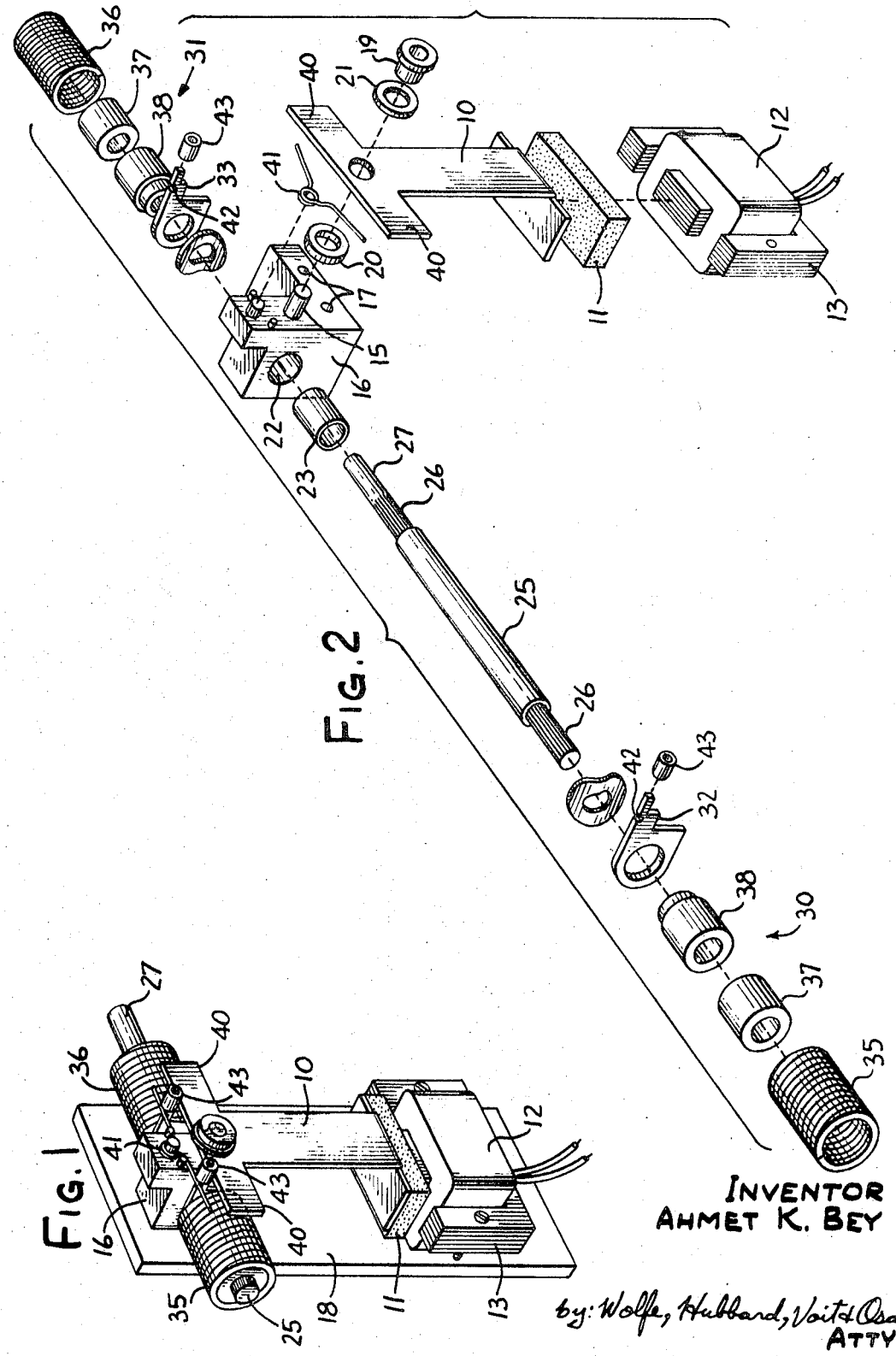

United States Patent Office 3,470,403
Patented Sept. 30, 1969

3,470,403
ELECTRIC MOTOR WITH TORQUE AMPLIFIED OUTPUT
Ahmet K. Bey, 3435 S. Racine St., Chicago, Ill. 60608
Filed May 10, 1967, Ser. No. 637,460
Int. Cl. H02k 33/02
U.S. Cl. 310—37          5 Claims

ABSTRACT OF THE DISCLOSURE

A vibratory electric motor having enhanced torque output is described in which oscillations of a permanent magnet armature in an alternating magnetic field are converted into rotational output torque by a combination of levers and one-way clutches.

---

The present invention relates to electric motors, and in particular to motors of the type which employ a vibrating or oscillating armature as opposed to the conventional rotary armature.

Motors are disclosed in the present applicant's co-pending applications Ser. Nos. 414,802, filed Nov. 30, 1964, 489,178, filed Sept. 22, 1965, 511,760, filed Dec. 6, 1965, and 537,070, filed Mar. 24, 1966 having means incorporating a spring clutch to transmit mechanical energy from the oscillation of a permanent magnet in an alternating magnetic field into rotation of an output shaft. With the motors of the foregoing patent applications the torque available from the output shaft is limited, however, by the configuration of the means utilized to translate the oscillatory or rocking motion of the motor armature into rotational movement of the output shaft. In each case the torque output is no greater than that generated by the movement of the magnetic armature in the alternating magnetic field created by the coil. For product applications requiring a relatively high degree of torque both for start-up or during running, such as in an electric can opener or similar appliance, such a motor must either utilize larger coils or magnets with an attendant increase in cost and bulk.

Another desirable feature of such motors is that of relatively continuous output shaft motion during both phases of the swing of the motor armature through the alternating magnetic field. Without such a feature, the output rotation is in discrete steps with a dead space in between power cycles while the armature goes through a return stroke. The use of two armatures swinging in opposite phase to one another is one means of achieving continuous motion, but this expedient requires additional structure including a relatively expensive additional magnet. In large mass production applications where a cost differential of a few cents per motor may make a design uneconomical to manufacture, the need for such additional structure is a serious disadvantage. Although a single magnet device may cause more vibration than a double magnet unit with opposed swings, this disadvantage is more than offset by the cost savings involved.

Accordingly, it is a principal object of the present invention to provide an electric motor which has available at the output shaft a relatively high torque by comparison with conventional motors of similar size and weight. It is contemplated that this result may be achieved without the necessity for means such as gear reduction boxes or special magnets and coils, with their disadvantages of cost, size and weight.

Another object is the provision of an electric motor of the character described in which relatively continuous output shaft rotation is achieved during both phases of the swing of a single magnet in the motor armature.

It is also an object to provide a motor of the above description which may be physically packaged within a relatively small, compact volume, with an output shaft being located adjacent one end of the package for installation in narrow areas. Further advantages are contemplated for the reason that the motor of the present invention utilizes no rotors, brushes, or other spark-producing contacts which may pit, corrode, or cause a spark hazard in explosive atmospheres.

A further object is the provision of a series or range of motors having different torque outputs and output speeds, while using the same coils, magnets, and other basic electrical components. Stated another way, it is intended that the designer need only change the relative sizes of certain parts to achieve whatever output torque or rotational speed may be desired for a particular motor application.

Other objects and advantages of the invention will become apparent upon reading the following detailed description and upon reference to the drawings, in which:

FIGURE 1 is an overall perspective of an electric motor constructed according to the present invention, with the housing, connecting wires, and other peripheral elements being omitted for clarity;

FIG. 2 is an exploded perspective of the motor of FIG. 1;

FIG. 3 is a sectional elevation of the motor of FIG. 1;

FIG. 4 is an elevation of the motor taken 90° from the view of FIG. 3, showing the rocker armature in partial section;

FIG. 5 is a detail of the armature pivot and return spring taken 180° from the view of FIG. 3;

FIG. 6 is a detail of one rocker arm of the motor;

FIG. 7 is a plan view of the motor of FIG. 1;

FIG. 8 is a slightly reduced partial elevation similar to FIG. 3, showing the rocking action of the armature of the subject motor; and FIG. 9 is an enlarged partial section of an alternative embodiment of the subject motor having a roller-and-ramp type of one-way clutch at the output shaft.

While the invention will be described in connection with certain illustrative embodiments, it will be understood that it is not intended to so limit the invention, but rather to cover all alternative and equivalent constructions as may be included within the spirit and scope of the invention as defined by the appended claims.

Turning first to FIG. 1, there is shown an exemplary embodiment of the present invention. As in other motors of this type, the motive force is derived from the oscillation of an armature 10 carrying a permanent magnet 11 which is caused to forcibly oscillate by the alternating magnetic field of a coil 12. For maximum torque output, the magnet 11 is preferably disposed with the polarity pattern illustrated in FIG. 3. The coil 12 is connected to a source of alternating current (not shown) which in common commercial practice comprises a regular 110 volt household line. The usual laminated core 13 is also provided to enhance and direct the alternating magnetic field of the coil 12 in the vicinity of the magnet 11.

The armature 10 is pivoted about a shaft 15 which is in turn carried by a pivot block 16. The pivot block 16 is provided with suitable mounting holes 17 whereby the block 16 and thereby the pivoted armature 10 may be secured to a frame 18 of the appliance in which the motor is to be employed. The coil 12 is similarly secured by any suitable means, such as bolts, so that the pivot block 16 and coil 12 are maintained in fixed relationship to each other. Referring in particular to FIGS. 2 and 4, it may be seen that the armature 10 is secured to the shaft 15 by means of a pressed-on bushing 19 which pivots the armature between a spacer washer 20 and a spring washer 21. These elements provide positive spacing for the armature 10 during its oscillatory motion, while assuring that its free swing is unimpeded.

The pivot block 16 is also provided with a bore 22 having a bushing 23 in which an output shaft 25 is journalled. As is best shown in FIG. 3, the output shaft 25 is provided at each end with short splined extensions 26, and a further extension 27 is provided at one end from which the output rotation of the motor may be derived. Output rotation is impressed on the output shaft 25 by a pair of one-way clutches 30, 31 which are connected to the armature by rocker arms 32, 33. In the illustrated embodiment of FIGS. 1–8, these clutches comprise closely-coiled helical clutch springs 35, 36 which encircle and grip a fixed bushing 37 and a rotatable bushing 38 at each end of the output shaft 25. The fixed bushing 37 is internally splined and thus fixed to the splined extensions 26 of the output shaft 25. The rotatable bushing 38 is internally smooth and is thus freely rotatable with respect to the output shaft 25.

The helical clutch springs 35, 36 are formed so that their free internal diameter, measured when the springs are standing free rather than being supported and spread by theb ushings 37, 38, is slightly smaller than the outside diameter of the latter bushings. It will therefore be appreciated that each spring will act as a one-way clutch in which relative rotation of the two bushings 37, 38 in one direction is permitted but in which the tightening action of the springs 35 will solidly lock the bushings together against rotation in the opposite direction. This is due to the well-known characteristic of a helical spring to tighten its internal diameter when its ends are twisted in the direction in which the spring is wound, and to loosen when the ends are twisted in the opposite direction.

In keeping with the invention, continuous motion of the output shaft 25 is achieved by causing the one-way clutches 30, 31 to cooperate in producing motion in the same direction during each operating cycle of the armature 10. The helical clutch springs 35, 36 are wound in opposite directions for this purpose so that the preferential or lock-up direction of rotation with respect to the output shaft 25 is the same for each one-way clutch 30, 31. Armature motion is transmitted to the one-way clutches 30, 31 by means of the rocker arms 32, 33. The arms 32, 33 are in turn operated by shoulders 40, extending laterally of the armature 10, giving it a characteristic T-shape. The arms 32, 33 are resiliently retained in operating engagement with the armature shoulders 40 by a return spring 41. Each rocker arm 32, 33 is provided at its tip with a depression or notch 42 wherein the ends of the return spring 41 are retained. Sleeves 43 of a nylon or similar antifriction plastic are provided for the tips of the rocker arms 32, 33 where they contact the armature shoulders 40 as a protection against wear. The return spring 41 is itself carried by the pivot block 16 on a central locating pin 45 and a pair of auxiliary pins 46.

In operation, the return spring 41 resiliently urges the rocker arms 32, 33 into engagement with the armature shoulders 40. As the armature 10 oscillates under the force induced by the alternating magnetic field of the coil 12, the armature 10 swings in an arc with a period determined primarily by the frequency of the alternating magnetic field, and with an amplitude determined by the mass of the oscillating system, the length of the armature 10, and the spring force supplied by the return spring 41. If a given application demands a motor having a slower output rotational speed, the designer need only adjust the foregoing parameters to achieve the desired result. If the armature 10 is lengthened or if the spring 41 is increased in its resilient force, for example, the amplitude of the armature swing will be correspondingly reduced with a corresponding reduction in the amount of output shaft rotation induced by each operating cycle. In practice, the armature 10 and return spring 41 are designed such that the assembly has a natural frequency of oscillation which approximates the operating frequency of the magnetic field in the coil 12, which in most instances is the common household line frequency of 60 Hz.

As the armature shoulders 40 rise and fall relative to the pivot block 16 and output shaft 25 during the oscillation of the armature 10, the rocker arms 32, 33 are caused to follow the shoulders 40 under the resilient pressure of the return spring 41. When the armature 10 swings to the viewer's left, as illustrated in FIGS. 5 and 8, the left rocker arm 32 is forced upward against the return spring 41, while the right arm 33 is resiliently urged downward to follow the receding shoulder on the opposite side. The one-way clutches 30, 31 are positioned as previously described so that the preferential rotational direction of the output shaft 25 is in the same direction during motion of either rocker arm 32, 33. In the present illustration, the left rocker arm 32 is delivering rotational torque to the output shaft 25 through its one-way clutch 31, while the other rocker arm 33 slips freely in the opposite direction through its respective clutch 30. When the armature swings in the return direction, the clutch roles are reversed, and the output shaft 25 is thereby caused to rotate stepwise in its preferred direction, with a power impulse being obtained from each swing of the armature 10. Because the armature 10 oscillates at a relatively high frequency with respect to output shaft rotation, the individual power pulses are virtually indistinguishable, and the effect is that of continuous rotation.

Further in accordance with the invention, a wide range of output torque and output shaft rotational speed can be achieved merely by varying the dimensions of certain of the motor components. It may be seen that the geometry of the T-shaped armature 10 determines the amount of rotation to be applied to the output shaft 25 during each swing. With a given swing amplitude and frequency, the output shaft torque can be increased and its speed correspondingly decreased by merely decreasing the width of the armature shoulders 40 with respect to the total length of the armature. Alternatively, the armature 10 can be kept unchanged, while increasing the length of the rocker arms 32, 33. As a further variation, the relative strength of the return spring 41 can be altered so as to decrease the swing amplitude and thereby induce a shorter power stroke and a correspondingly slower output shaft rotation for a given input frequency. It may therefore be seen that the designer has a wide range of variables with which to design a motor for a particular application, while utilizing a larger number of the same operating parts for each different motor. Such parts as the one-way clutches 30, 31, the pivot block 16 and its associated members, and the coil 12 are all unchanged for each motor application.

In an alternative embodiment, the one-way clutches 30, 31 may comprise roller-and-ramp devices, as illustrated in FIG. 9. In this type of clutch the respective rocker arms 32, 33 are each secured to a rotable sleeve 50 which is rotatably carried by a bushing 51. The output shaft 25 is splined to the bushing 51, and rotates with it. A plurality of spaced ramps 52 is provided on the periphery of the bushing 51, which ramps slope gradually from the bushing surface at one edge, and terminate in a sharp abutment 53 at the other edge. Captive rollers 55 are retained within the ramps 52 by the outer sleeve 50. When the sleeve 50 is rotated in the counterclockwise direction, as seen in FIG. 9, the captive rollers 55 are carried into the deepest portion of the ramps 52 adjacent the abutment 53. In this position the sleeve 50 may rotate unimpeded. When the direction of sleeve rotation is reversed, however, the captive rollers 55 are frictionally drawn away from the ramp abutment 53 and caused to wedge solidly between the bushing 51 and the sleeve 50, thereby locking the two members together for rotation in the clockwise direction and achieving the desired one-way clutch action.

I claim as my invention:

1. An electric motor comprising in combination, a frame, means on said frame including a coil for the production of an alternating magnetic field which periodically reverses at a uniform rate, an armature pivoted to said frame, said armature having a pair of opposed shoulders and carrying a permanent magnet positioned substantially within said alternating electromagnetic field whereby a rocking motion is induced in said armature, an output shaft on said frame disposed transversely to the pivot axis of said armature, a pair of one-way clutches each drivably engaging said output shaft for rotation in one direction, said clutches each carrying a rocker arm engaging one of said shoulders.

2. An electric motor as defined in claim 1 having spring means for resiliently urging said armature into a centered position with respect to said coil.

3. An electric motor as defined in claim 1 in which each of said one-way clutches includes a helical spring encircling said output shaft with a plurality of closely-fitting coils, said coils having a free inside diameter less than the outside diameter of the engaged portion of said output shaft.

4. An electric motor as defined in claim 1 in which each of said one-way clutches includes a spring-loaded captive jamming roller retained in a beveled notch adjacent the surface of said output shaft, and a rotatable sleeve encircling said output shaft and engageable with said jamming roller.

5. An electric motor as defined in claim 1 in which the effective lengths of said shoulders and rocker arms are substantially equal, and the length of said armature interconnecting the magnet and armature pivot is substantially greater than either of said shoulders or said rocker arms, whereby the torque generated by the rocking motion induced in said magnet is multiplied prior to being impressed upon said output shaft.

References Cited
UNITED STATES PATENTS

| | | | |
|---|---|---|---|
| 3,302,045 | 1/1967 | Dotto | 310—37 |
| 2,096,458 | 10/1937 | Johnson | 310—37 |
| 1,733,872 | 10/1929 | Graseby | 310—37 |
| 3,382,382 | 5/1968 | Dotto | 310—37 |
| 3,202,849 | 8/1965 | Neal | 310—37 |
| 3,351,789 | 11/1967 | Bertling | 310—37 |
| 3,320,445 | 5/1967 | Bey | 310—20 |
| 2,484,093 | 10/1949 | Huetten | 310—32 |
| 2,958,793 | 11/1960 | Lonnquist | 310—37 |

MILTON O. HIRSHFIELD, Primary Examiner

B. A. REYNOLDS, Assistant Examiner

U.S. Cl. X.R.

74—126